United States Patent [19]

Laignel et al.

[11] 4,150,810
[45] Apr. 24, 1979

[54] MACHINE WELDED OBTURATOR

[75] Inventors: Raymond A. Laignel, Ginestas; Patrick F. Mommeja, Arles, both of France

[73] Assignee: Constructions Metalliques de Provence, Levallois Perret, France

[21] Appl. No.: 698,675

[22] Filed: Jun. 22, 1976

[30] Foreign Application Priority Data

Jun. 17, 1975 [FR] France .................. 75 20997

[51] Int. Cl.² .................................. F16K 5/06
[52] U.S. Cl. .......................... 251/309; 251/315; 251/357; 29/157.1 R
[58] Field of Search ............ 251/315, 306, 357, 368, 251/309; 29/157.1 R; 737/375

[56] References Cited

U.S. PATENT DOCUMENTS

| 1,106,064 | 8/1914 | Thompson | 291/368 |
|---|---|---|---|
| 1,438,597 | 12/1922 | Jardine | 251/368 |
| 2,632,624 | 3/1953 | Giauque | 251/368 |
| 2,904,877 | 9/1959 | Edelen | 251/368 |
| 2,969,218 | 1/1961 | Shaw | 251/357 |
| 3,208,718 | 9/1965 | White | 251/315 |
| 3,246,873 | 4/1966 | Johnson | 251/315 |
| 3,323,537 | 6/1967 | Shafer | 251/315 |
| 3,339,259 | 9/1967 | Johnson | 251/315 |
| 3,367,359 | 2/1968 | Johnson | 137/375 |
| 3,544,066 | 12/1970 | Fawkes | 251/306 |
| 3,678,956 | 7/1972 | Ebin | 251/315 |
| 3,737,145 | 6/1973 | Heller | 251/315 |
| 3,749,359 | 7/1973 | Montesi | 251/306 |
| 3,926,407 | 12/1975 | Förster | 251/315 |
| 3,958,314 | 5/1976 | Kurkjian | 251/306 |

FOREIGN PATENT DOCUMENTS

| 1172335 | 2/1957 | France | 251/315 |
|---|---|---|---|
| 1224602 | 3/1971 | United Kingdom | 251/309 |
| 1329362 | 9/1973 | United Kingdom | 251/315 |

*Primary Examiner*—William R. Cline
*Assistant Examiner*—H. Jay Spiegel
*Attorney, Agent, or Firm*—Lewis H. Eslinger

[57] ABSTRACT

The invention relates to machine welded obturators of generally spherical shape for equipping rotary plug valves. These obturators are composed of a central tube and an envelope formed by two hemispherical segments of pressed sheet metal which are truncated by two planes perpendicular to their diametral plane and which are welded on the one hand to one another in a diametral plane passing through the axis of the tube and through the axis of rotation and on the other hand, to two ends of the central tube, and at its outer surface, in a plane parallel to its diametral plane, each segment carries a sealing bearing or a seal in a groove.

4 Claims, 5 Drawing Figures

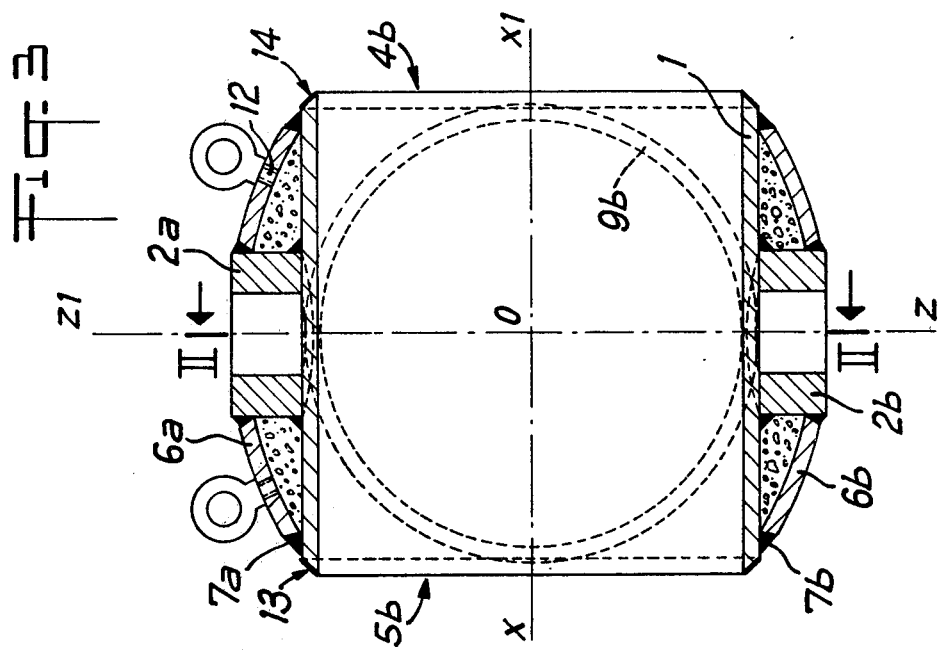
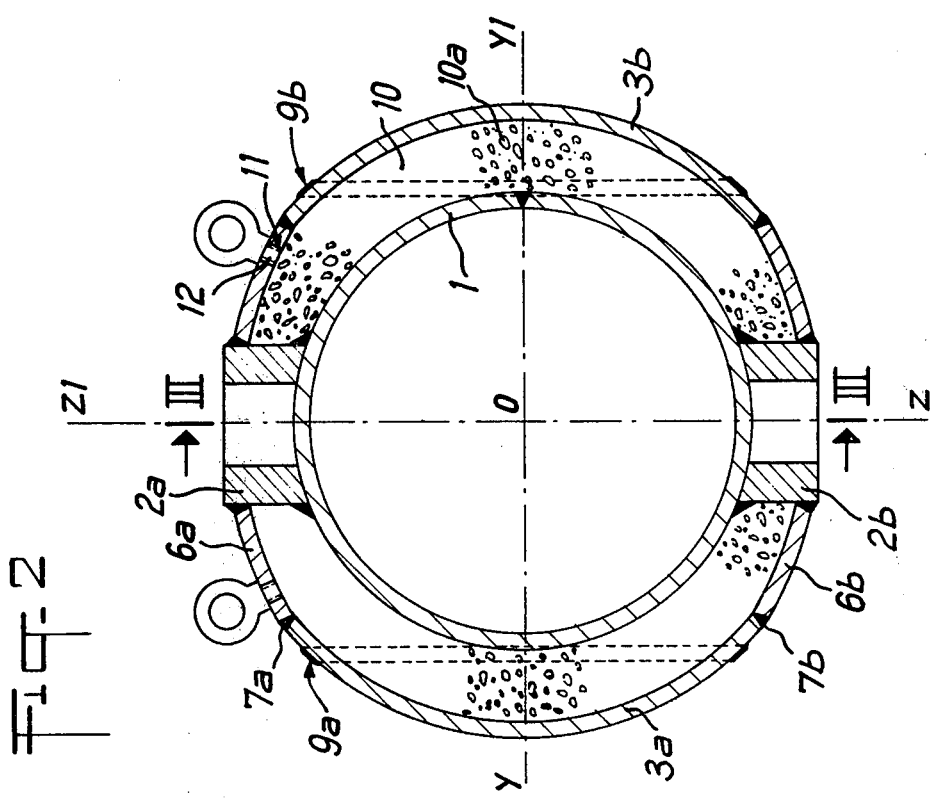

MACHINE WELDED OBTURATOR

The present invention relates to machine welded obturators of general spherical shape and rotary plug valves equipped therewith.

The technical field of the invention is that concerning the construction of spherical plug valves particularly valves of large diameter.

At present, the rotary obturators of valves are spherical members of cast or forged steel generally solid outside the pipe for the passage of fluid, currently known by the name of plug.

With valves of large diameter, the weight of the solid plugs becomes very great as well as the cost since the steel of which they are composed is a quality steel. This traditional structure of spherical plugs is due solely to the methods of manufacture and machining used and is not imposed by the necessity to withstand mechanical forces. On the contrary, the quantity of metal is very largely superfluous for withstanding forces to which the plug is subjected.

It is known to have been possible to lighten valve members, particularly rotary plug valve members, by replacing the cast or forged parts by machine welded constructions.

The object of the present invention is to provide lightened spherical obturators, of machine welded construction, the cost of which is much less than that of the traditional solid plugs.

The obturator according to the invention is of known type comprising:
- a tube having an axis and two opposite ends which delimit a pipe passing right through the said obturator.
- an envelope of generally spherical shape surrounding the said tube,
- and pivots for turning the said tube and the said envelope, inside the valve, about an axis of rotation perpendicular to the axis of the tube.

The object of the invention is achieved by means of an obturator of this type in which the envelope is formed of two identical hemispherical segments, of pressed sheet metal, each having a diametral plane, which segments are each truncated by two planes perpendicular to the said diametral plane, which, on each of them, cut out two identical and diametrally opposite openings in the shape of a semi-circle the diameter of which is slightly greater than the outer diameter of the said tube and which segments are welded, on the one hand, to one another end to end in a diametral plane passing through the said axis of rotation and through the axis of the tube, and on the other hand, to the two ends of the said tube which they envelop.

Preferably, the two hemispherical segments are furthermore truncated by two planes perpendicular to the axis of rotation and the spherical envelope comprises two spherical caps of pressed sheet steel of a radius greater than that of the said hemispherical segments, which are welded by their periphery to the said segments along the said truncations.

In a first embodiment, the fluid tightness of the plugs in the closed position is obtained by means of two diametrally opposite seat bearings arranged on a diametral axis perpendicular to the axis of rotation and to the axis of the central tube, which bearings are composed of a re-metalling of hard metal which is deposited by soldering on the outer surface of each segment of the plug then machined with precision to follow a spherical surface.

In a second embodiment, the spherical envelope comprises two circular grooves, diametrally opposed and arranged on a diametral axis perpendicular to the axis of rotation and to the axis of the central tube, in each of which is disposed a seal for the closed plug.

The two ends of the central tube comprise a re-metalling in hard metal deposited by soldering and machined with precision to follow a spherical surface, which serve as supports for the seals in the open position of the plug.

The result of the invention, is a novel product constituted by a machine welded spherical plug and the rotary plug valves equipped therewith.

The advantages of a plug according to the invention are the following:

the cost is very reduced with respect to that of a cast or forged spherical plug of the same diameter.

the parts which enter into the manufacture of a machine welded plug according to the invention, are the following:
- a central tube which can be a commercial tube or a sleeve obtained from a rolled steel sheet.
- two hemispherical segments of pressed steel sheet. These segments are then truncated so as to provide the passages for the central tube.
- two spherical caps of pressed steel sheet constituting the summit and the lower portion of the plug.
- two sleeves in which the pivots rotate, which are bored out parts.

It is currently known to make such hollow ware pieces, particularly hemispherical segments and spherical caps of pressed sheet steel which is frequently used for the bottoms of tanks. A tolerance of the order of ±3 mm is allowed for the sides of these parts and it is known to obtain such precision with pieces of hollow ware.

The hollow ware parts can be produced from a relatively mild steel for example from A52 steel.

Only the re-metallings intended to serve as seat bearings are of hard metal and stainless or not and are machined with great precision of the order of ±0.05 mm.

As an example, a plug having an external diameter of 1.50 m comprises 2.750 Kg of A52 FP2 steel. The plugs in accordance with the invention provide an important economy in weight, quality of steel, and machining operations by the manufacturing tolerances.

Filling the space comprising the central tube and the spherical envelope with a material which resists compression is an economic means of avoiding deformations of the spherical envelope when the plug is closed, in the case where the fluid pressure is high. This filling enables the thicknesses of the metal of the spherical envelope and of the central tube to be reduced. The filling can be formed from an expanded material heat polymerised in situ, by heating the spherical envelope. In this case, when the envelope is cooled, after polymerisation and hardening of the filling, it becomes pre-stressed in tension, in the manner of a binding, which increases its resistance to external pressure.

The following description refers to the accompanying drawings which represent one embodiment of a plug in accordance with the invention, without any limiting character.

FIG. 2 is a transverse section passing through the axis of rotation.

FIG. 3 is a longitudinal section passing through the axis of rotation.

FIG. 1 is an exploded view showing the constituent parts of a rotary plug, machine welded, in accordance with the invention.

Figure 1:
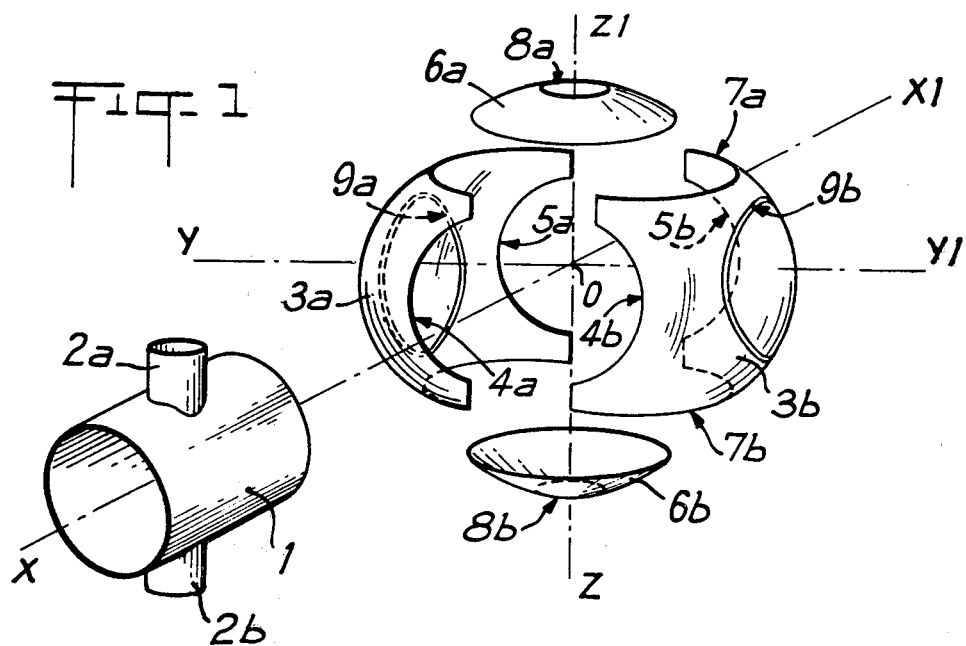
FIG. 1 is an exploded view in perspective of a plug in accordance with the invention.

The latter comprises a central tube 1 having an axis x x1, the internal diameter of which is equal to the diameter of the two fluid inlet and outlet pipes. This tube can be a commercial mild steel tube or a sleeve obtained by rolling and welding a sheet of mild steel, for example a sheet of A52 steel of 40 mm in thickness for a passage diameter of 1 metre.

Two diametrally opposite sleeves 2a, 2b are welded to the centre of the tube 1. These sleeves, one of which serves as a housing for a lower pivot and the other as a housing for the rotary operating key, form the axis of rotation of the plug.

Furthermore, the plug comprises an envelope 3 of generally spherical shape. This is composed of two hemispherical segments 3a, 3b each formed from a pressed mild steel sheet. For example, for an external diameter of the order of 1.50 m, a sheet of A52 steel of 40 mm in thickness is used. The two hemispherical segments are truncated by two planes symmetrical with respect to the centre and separated by a distance substantially equal to the length of the tube 1, which produce on each segment two contours in the shape of a semi-circle 4a, 4b and 5a, 5b situated opposite one another, the diameter of which is slightly greater than the outer diameter of the tube 1. The two hemispherical segments are welded edge to edge in a plane passing through the axis x x1 and of the axis of rotation z z1.

Once assembled, they constitute one spherical segment having an axis x x1. In the example shown, the two hemispherical segments 3a and 3b are likewise truncated at 7a and 7b by two planes symmetrical with respect to the centre and perpendicular to the axis of rotation z z1 and the two truncated portions are replaced by two spherical caps 6a, 6b having a radius greater than that of the hemispherical segments 3a and 3b, which are welded by their periphery to the truncations 7a and 7b.

These two caps are also obtained by stamping from a mild steel sheet.

It is pointed out, that these caps, which are intended to reduce the space taken up by the height of the plug, are optional. As a variant, the two hemispherical segments 3a and 3b need not include the truncations 7a and 7b.

The caps 6a and 6b each comprise at their summit a truncation 8a, 8b the diameter of which is slightly greater than the outer diameter of the sleeves 2a and 2b which are housed in the openings and are welded to the periphery of the latter.

At its outer surface, each of the two hemispherical segments 5a and 5b carries a sealing device 9a, 9b for the plug in its closed position, having the shape of a circle centred on the axis y y1 perpendicular to the axes x x1 and z z1.

FIGS. 2 and 3 are sections of the assembled plug in the planes oyz on the one hand and oxz on the other. Similar parts to those in FIG. 1 are represented by the same references.

In the embodiment of FIGS. 2 and 3, once the metallic pieces are assembled by welding, the space 10 comprising the tube 1 and the spherical envelope is filled with a solid or incompressible powdered material 10a. To this end, the upper cap 6a comprises one or a plurality of screw threaded openings 11 for the introduction of the filling material 10a. These openings are closed by plugs 12 which may be provided or not with a lifting ring.

The filling material is for example sand or metal balls. It can also be a pasty or liquid substance which hardens after having been cast into the space 10, for example concrete, plaster or a polymerisable resin.

Preferably, the space 10 is filled with cellular concrete which is cast into the mould formed by the two walls and which is then expanded in the said mould by the release of heat.

This embodiment has the advantage that the spherical envelope is heated and expands whilst the cellular concrete is placed and is then maintained prestressed in tension after the concrete is placed and cooled, which increases its resistance to pressure when the plug is closed. The placing of the concrete and the increase in pre-stressing can be accelerated by heating the spherical envelope to a temperature of the order of 160° to 180° C. during expansion.

The cellular concrete can be replaced by a rigid cellular foam the expansion and polymerisation of which are obtained in situ by delivering into the space 10 the mixture of liquid or powdered resins giving rise to the rigid foam, for example a polyurethane foam. In this case also, the spherical envelope can be heated to the polymerisation temperature (160° to 180° C.) whilst the tube 1, after an initial heating necessary for polymerisation, is progressively cooled by the passage of a current of fresh air whilst the outer envelope remains heated throughout the whole of the polymerisation.

Using a filling of cellular concrete or of a low density rigid foam, has the advantage of not increasing the weight of the plug too much.

For example, in a plug having an outer diameter of 1.50 m and a passage diameter of 1 m, the volume of the space 10 is of the order of 450 litres.

FIGS. 2 and 3 show the sleeves 2a and 2b welded to the outer surface of the tube 1. As a variant, for valves of large diameter which require a very resistant mounting of the sleeves 2 on the tube 1, the sleeves may be spot or stitch welded to the tube 1.

FIG. 3 shows the ends of the tube 1 chamfered and re-filled with solder. The re-metallings 13 and 14 which are constituted by a hard metal and stainless or non-stainless, are then machined with precision to follow a spherical surface having a centre O and act as bearings for the fluid-tight joints when the plug is in its open position.

FIG. 1 shows, in transverse section, the bearings 9a and 9b produced by depositing by soldering on to the outer surface of the two hemispherical segments 3a and 3b, a re-metalling of hard metal and stainless or non-stainless then by machining the latter with precision to follow a spherical surface having a centre O.

Figure 4:
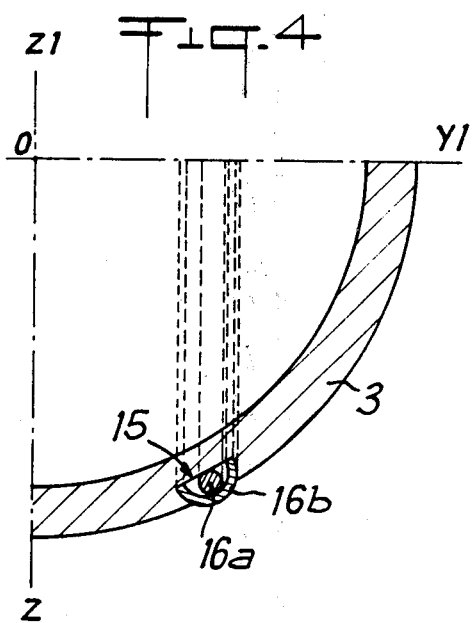
FIGS. 4 and 5 are partial transverse sections of an embodiment comprising encased seals.

FIG. 4 shows a partial section in the plane oyz, of a variant in which the seat bearings 9a, 9b are replaced by circular grooves 15 centred on the axis y y1, hollowed out within the thickness of the spherical envelope 3. These grooves have a transverse section of trapezoidal or dovetail shape and contain a seal 16 which co-operates, when the plug is closed, with a seating carried by the body of the valve or with a sliding seating.

FIG. 4 shows an embodiment in which the seal 16 is composed of a central ring 16a covered externally by a ring 16b. The ring 16a is, for example, a metallic or elastomeric seal press-crimped or spun into the groove 15 with the addition or not of the ring 16b, which plays the role of an anti-extrusion ring and which is for example of polytetrafluourethylene.

Figure 5:
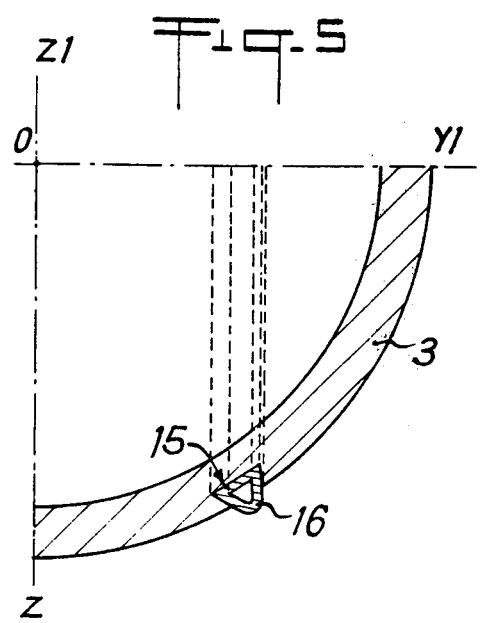

FIG. 5 shows a partial section of another embodiment in which the seal 16 is a hollow profile elastomeric or metallic comprising a heel forcibly engaged in the dovetail. The seals crimped into the grooves 15 may have other different forms.

In the case of plugs for valves of small diameter, a plastic sheath could be used as a seal comprising an elastic steel wire on the inside of piano wire type.

The embodiments according to FIGS. 4 and 5 comprising seals crimped into a groove have the advantage of possibly avoiding the re-metalling of the sphere and above all the precision machining of the bearings which are costly operations.

The machined seat bearings 13 and 14 situated at the end of the tube 1 may also be replaced by seals crimped into a groove of trapezoidal profile issuing into the chamfer at the end of the tube.

In the latter case, the seating must be machined with care according to a spherical or trunconic profile.

The various constituent elements of the machine welded plug which have just been described by way of example can of course be replaced by equivalent elements well known to the skilled man, without departing from the scope of the invention.

We claim:

1. An obturator of generally spherical shape for a spherical rotary plug valve comprising:
    a tube having a longitudinal axis and two opposite ends defining a conduit passing through the obturator;
    an envelope of generally spherical shape having diametrically opposed openings formed therein and surrounding said tube, said envelope being welded at said openings therein to the ends of said tube;
    and means for driving said tube and said envelope in rotation about an axis perpendicular to the axis of the tube,
    said envelope including an outer surface having two diametrically opposed circular bearings thereon arranged on a diametrical axis extending perpendicular to the axis of rotation and to the axis of the tube, said bearings comprising metal annular surfaces machined with precision on said sheet material to follow a spherical surface and serve as a support for fluid-tight seals when the obturator is closed; the space between the tube and the envelope being filed with a material which is poured in this space then expanded and solidified in place by heating the spherical envelope, so that the latter is pre-stressed in tension after cooling.

2. An obturator according to claim 1 in which the space between the tube and envelope is filled with cellular concrete which is expanded in place while heating the envelope to a temperature of about 160° to 180° during expansion.

3. An obturator according to claim 1 wherein said metal annular surfaces machined in the envelope comprise circular grooves having a horizontal cross-section; and, a pair of fluid-tight seals respectively mounted in said grooves, each of said seals having a hollow profile of triangular section and being force fit in said grooves.

4. An obturator as defined in claim 1 wherein said metal annular surfaces machined in said envelope comprise a pair of diametrically opposed circular grooves; and, a pair of fluid-tight seals respectively mounted in said grooves, said seals each comprising a ring situated at the base of its associated groove and covered externally by an anti-extrusion ring having two edges forcibly engaged within the groove.

* * * * *